United States Patent [19]
Kimura et al.

[11] Patent Number: 6,010,778
[45] Date of Patent: *Jan. 4, 2000

[54] COATING COMPOSITION UTILIZING MODIFIED SOL HAVING TIN OXIDE-TUNGSTEN OXIDE COMPLEX COLLOID PARTICLES AND LENS COATED THEREWITH

[75] Inventors: Yoichi Kimura, Koganei; Toshihiko Horibe, Yamato; Koji Watanabe, Kawasaki, all of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/417,728

[22] Filed: Apr. 6, 1995

Related U.S. Application Data

[63] Continuation of application No. 08/069,571, Jun. 1, 1993, abandoned.

[30] Foreign Application Priority Data

Jun. 4, 1992 [JP] Japan .................................. 4-143065

[51] Int. Cl.$^7$ ...................................................... B32B 5/16
[52] U.S. Cl. .......................... 428/328; 351/159; 351/166; 428/403; 428/404; 428/412; 428/425.5
[58] Field of Search .................................... 428/328, 403, 428/404, 323, 423.1, 425.5, 412; 351/159, 166

[56] References Cited

U.S. PATENT DOCUMENTS

| | | | |
|---|---|---|---|
| 4,210,699 | 7/1980 | Schroeter et al. | 428/331 |
| 4,374,158 | 2/1983 | Taniguchi et al. | 427/41 |
| 4,571,365 | 2/1986 | Ashlock | 428/412 |
| 4,702,773 | 10/1987 | Ashlock et al. | 106/287 |
| 5,094,691 | 3/1992 | Watanabe et al. | 106/286.4 |
| 5,165,992 | 11/1992 | Yajima | 428/328 |
| 5,188,667 | 2/1993 | Watanabe et al. | 106/286.4 |
| 5,496,641 | 3/1996 | Mase et al. | 428/423.1 |
| 5,594,088 | 1/1997 | Nagata et al. | 528/77 |

FOREIGN PATENT DOCUMENTS

| | | |
|---|---|---|
| 1168394 | 5/1984 | Canada . |
| 0 525 215 | 2/1993 | European Pat. Off. . |
| 40 35 418 | 5/1991 | Germany . |
| 52-11261 | 1/1977 | Japan . |
| 53-111336 | 9/1978 | Japan . |
| 55-13747 | 1/1980 | Japan . |
| 56-84729 | 7/1981 | Japan . |
| 56-166214 | 12/1981 | Japan . |
| 57-23611 | 2/1982 | Japan . |
| 57-29001 | 2/1982 | Japan . |
| 57-54901 | 4/1982 | Japan . |
| 57-66402 | 4/1982 | Japan . |
| 58-52601 | 3/1983 | Japan . |
| 58-169101 | 10/1983 | Japan . |
| 59-48702 | 3/1984 | Japan . |
| 59-78304 | 5/1984 | Japan . |
| 59-108064 | 6/1984 | Japan . |
| 59-115366 | 7/1984 | Japan . |
| 59-126501 | 7/1984 | Japan . |
| 59-149301 | 8/1984 | Japan . |
| 59-155801 | 9/1984 | Japan . |
| 60-45201 | 3/1985 | Japan . |
| 60-88901 | 5/1985 | Japan . |
| 60-213901 | 10/1985 | Japan . |
| 60-252633 | 12/1985 | Japan . |
| 61-48123 | 10/1986 | Japan . |
| 61-54331 | 11/1986 | Japan . |
| 61-283629 | 12/1986 | Japan . |
| 62-151801 | 7/1987 | Japan . |
| 62-275201 | 11/1987 | Japan . |
| 63-37142 | 7/1988 | Japan . |
| 63-191101 | 8/1988 | Japan . |
| 63-223701 | 9/1988 | Japan . |
| 63-247702 | 10/1988 | Japan . |
| 63-258963 | 10/1988 | Japan . |
| 63-275682 | 11/1988 | Japan . |
| 63-305175 | 12/1988 | Japan . |
| 63-308069 | 12/1988 | Japan . |
| 64-51478 | 2/1989 | Japan . |
| 64-56773 | 3/1989 | Japan . |
| 1-217402 | 8/1989 | Japan . |
| 1-245062 | 9/1989 | Japan . |
| 1-56093 | 11/1989 | Japan . |
| 1-306477 | 12/1989 | Japan . |
| 2-47044 | 2/1990 | Japan . |
| 2-75633 | 3/1990 | Japan . |
| 2-77434 | 3/1990 | Japan . |
| 2-189380 | 7/1990 | Japan . |
| 2-230103 | 9/1990 | Japan . |
| 2-261827 | 10/1990 | Japan . |
| 2-261832 | 10/1990 | Japan . |
| 2-261871 | 10/1990 | Japan . |
| 2-264902 | 10/1990 | Japan . |
| 2-274780 | 11/1990 | Japan . |
| 2-274781 | 11/1990 | Japan . |
| 3-2290 | 1/1991 | Japan . |
| 3-2459 | 1/1991 | Japan . |
| 3-6276 | 1/1991 | Japan . |
| 3-23882 | 3/1991 | Japan . |
| 3-72302 | 3/1991 | Japan . |
| 3-172369 | 7/1991 | Japan . |
| 56-99236 | 8/1991 | Japan . |
| 3-284715 | 12/1991 | Japan . |
| 4-6921 | 2/1992 | Japan . |
| 4-214028 | 8/1992 | Japan . |

OTHER PUBLICATIONS

Database WPI, Derwent Publications Ltd., London, GB; AN 91–263167, Jul. 25, 1991.

Primary Examiner—D. S. Nakarani
Attorney, Agent, or Firm—Vorys, Sater, Seymour and Pease LLP

[57] ABSTRACT

There are provided a coating composition, for use on a plastic lens with a refractive index exceeding 1.60, for avoiding interference fringes and unevenness in the reflected color, and a lens coated with such coating composition. The coating composition contains an organic silicon compound represented by $R^1_a R^2_b Si(OR^3)_{4-(a+b)}$ and modified sol of a double structure in which nuclei composed of tin oxide colloid particles are surrounded by tin oxide-tungsten oxide complex colloid particles, and the plastic lens is coated with such coating composition.

34 Claims, No Drawings

COATING COMPOSITION UTILIZING MODIFIED SOL HAVING TIN OXIDE-TUNGSTEN OXIDE COMPLEX COLLOID PARTICLES AND LENS COATED THEREWITH

This is a continuation of application Ser. No. 08/069,571 filed Jun. 1, 1993, now abandoned.

BACKGROUND OF THE INVENTION

1. Field of the Invention

The present invention relates to a coating composition adapted for use for molded plastic articles, and a plastic lens coated with said composition.

2. Related Background Art

Molded plastic articles are widely used, exploiting the advantages of light weight, ease of working, high impact strength etc. but are associated with drawbacks of susceptibility to scratching due to insufficient hardness, susceptibility to solvents, tendency of charging so as to dust absorption, and insufficient heat resistance have been inferior to molded inorganic glass articles for the use in spectacle lenses and window panes.

For this reason it has been proposed to apply a protective coating to the molded plastic article, and many coating compositions have been proposed for this purpose. Such proposals include, for example, "a coating composition containing an organic silicon compound or a hydrolyzed product thereof as a principal component (resinous component or film forming component)" which is disclosed in the Japanese Patent Laid-open Application No. 52-11261 and which was expected to provide a hard coating similar to the inorganic coating. This composition is commercially utilized for spectacle lenses.

However, since even this composition is still unsatisfactory in scratch resistance, there has been proposed, for example, a composition additionally containing colloidal silica sol, as disclosed in the Japanese Patent Laid-open Application No, 53-111336, and this composition is also commercially used for spectacle lenses.

On the other hand, the conventional spectacle lenses have mostly been produced by in-mold polymerization of a monomer, diethyleneglycol bisallylcarbonate. The resulting lens, having a refractive index of about 1.50 which is lower than the refractive index of 1.52 of glass lenses, shows a thicker rim portion within the lens in case of spectacles for near-sighted eyes, a major drawback disliked by the users. Also in case of reading glasses, the central portion of the lens becomes thicker, and such lens has been disliked by the users for this reason.

Because of such background, there have been developed monomers of a higher refractive index than that of diethyleneglycol bisallylcarbonate, as disclosed in the Japanese Patent Laid-open Applications Nos. 55-13747, 56-166214, 57-23611 and 57-54901, and, plastic lenses of medium to high refractive index of $n_d=1.54$–$1.60$ are being commercialized by several manufacturers. Also there is recently proposed a plastic lens of high refractive index exceeding 1.65.

The silica sol-containing coating composition mentioned above is also used in these lenses.

However, such silica sol-containing coating composition has had a first drawback of unaesthetic appearance, showing interference fringes on the obtained coating.

Also, on such coating on the lens, there is often formed an antireflective film, consisting of a multi-layered film of inorganic oxides based on the optical interference theory. Such antireflective film shows, for example, very pale green reflection color, and there has been a second drawback that such reflected color appears uneven, depending on the position on the lens surface.

SUMMARY OF THE INVENTION

In consideration of the foregoing, a first object of the present invention is to provide a coating composition that can form, on a molded plastic article of a high refractive index exceeding $n_d=1.60$, a coated film which does not show interference fringes or unevenness in the reflected color, and a lens coated with said composition.

A second object of the present invention is to provide a coating composition that is excellent in scratch resistance, surface hardness, abrasion resistance, flexibility, transparency, antistatic resistance, dyeability, heat effect, moisture resistance, chemical resistance etc., adapted for use on a molded plastic article, and a lens coated with said composition.

A third object of the present invention is to provide a plastic lens having a cured film that is excellent in scratch resistance, surface hardness, abrasion effect, flexibility, transparency, antistatic resistance, dyeability, heat resistance, moisture resistance, chemical resistance etc.

The above-mentioned objects can be attained, according to the present invention, by a coating composition containing:

(a) an organic silicon compound represented by a general formula:

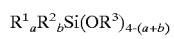

wherein:

R$^1$ stands for a functional radical or an organic radical with 4 to 14 carbon atoms containing an unsaturated double bond;

R$^2$ stands for a hydrocarbon or halogenated hydrocarbon radical with 1 to 6 carbon atoms;

R$^3$ stands for an alkyl, alkoxyalkyl or acyl radical with 1 to 4 carbon atoms; and a=0 or 1, b=0, 1 or 2, and a+b is 1 or 2, or a hydrolyzed product thereof; and (b) double-structured modified sol consisting of colloidal tin oxide particles surrounded by colloid particles of tin oxide-tungsten oxide complex.

Also according to the present invention there is provided a plastic lens consisting of:

a plastic substrate obtained by polymerization of a monomer mixture containing at least one polyisocyanate and at least one polyol and/or at least one polythiol, and a cured film, provided on said plastic substrate, obtained by coating and curing a coating composition containing:

(a) an organic silicon compound represented by a general formula:

wherein:

R$^1$ stands for a functional radical or an organic radical with 4 to 14 carbon atoms containing an unsaturated double bond;

R$^2$ stands for a hydrocarbon or halogenated hydrocarbon radical with 1 to 6 carbon atoms;

$R^3$ stands for an alkyl, alkoxyalkyl or acyl radical with 1 to 4 carbon atoms; and a=0 or 1, b=0, 1 or 2, and a+b is 1 or 2, or a hydrolyzed product thereof; and (b) double-structured modified sol consisting of colloidal tin oxide particles surrounded by colloid particles of tin oxide-tungsten oxide complex.

Explanation of component (a)

Among the compounds of the general formula (I), those having an epoxy radical as the functional radical represented by $R^1$ can be, for example, compounds represented by the following general formula (II) or (III):

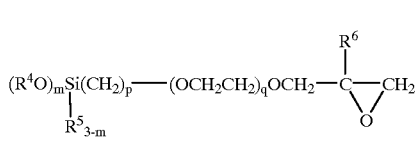
(II)

wherein:

$R^4$ stands for an alkyl, alkoxyalkyl or acyl radical with 1 to 4 carbon atoms;

$R^5$ stands for a hydrocarbon or halogenated hydrocarbon radical with 1 to 6 carbon atoms;

$R^6$ stands for a hydrogen atom or a methyl radical;

m is an integer 2 or 3;

p is an integer from 1 to 6; and q is an integer from 0 to 2.

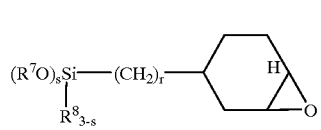
(III)

wherein:

$R^7$ stands for an alkyl, alkoxyalkyl or acyl radical with 1 to 4 carbon atoms;

$R^8$ stands for a hydrocarbon or halogenated hydrocarbon radical with 1 to 4 carbon atoms;

s is an integer 2 or 3; and r is an integer from 1 to 4.

The compounds represented by the foregoing general formulas, having an epoxy radical therein, are called epoxysilanes in general terms.

Examples of such epoxysilanes include γ-glycidoxypropyltrimethoxysilane, γ-glycidoxypropyltriethoxysilane, γ-glycidoxypropyltrimethoxyethoxysilane, γ-glycidoxypropyltriacetoxysilane, γ-glycidoxypropylmethyldimethoxysilane, γ-glycidoxypropylmethyldiethoxysilane, and β-(3,4-epoxycyclohexyl)ethyltriethoxysilane.

Also examples of the compounds of the general formula (I), other than those having an epoxy radical as the functional radical represented by $R^1$ but including those in which a=0, include trialkoxysilanes, triacyloxysilanes and tri-alkoxyalkoxysilanes such as methyltrimethoxysilane, methyltriethoxysilane, vinyltrimethoxysilane, vinyltriethoxysilane, vinyltriacetoxysilane, vinyltrimethoxyethoxysilane, γ-methacryloxypropyltrimethoxysilane, aminomethyltrimethoxysilane, 3-aminopropyltrimethoxysilane, 3-aminopropyltriethoxysilane, phenyltrimethoxysilane, phenyltriethoxysilane, γ-chloropropyltrimethoxysilane, γ-mercaptopropyltriethoxysilane and 3,3,3-trifluoropropyltrimethoxysilane.

The above-cited examples of the compounds of the general formula (I) are all trifunctional having three $OR^3$ combined to Si atom (a+b=1), but corresponding bifunctional compounds having two $OR^3$ radicals (a+b=2) can naturally be utilized also. Examples of such corresponding bifunctional compounds include dimethyldimethoxysilane, diphenyldimethoxysilane, methylphenyldimethoxysilane, methylvinyldimethoxysilane and dimethyldiethoxysilane.

The compounds of the general formula (I) may be used singly, or as a mixture of at least two compounds according to the purpose.

In particular, when a bifunctional compound is employed, it is preferably employed in combination with a trifunctional compound. In such combined use, there is attained a relation 2>a+b>1 in average.

Furthermore, a corresponding tetrafunctional compound with a+b=0 may also be used in combination. Examples of such corresponding tetrafunctional compound include methyl silicate, ethyl silicate, isopropyl silicate, n-propyl silicate, n-butyl silicate, t-butyl silicate and sec-butyl silicate.

The compound of the general formula (I) may be used in its original form, but is preferably used as the hydrolyzed product thereof, for the purpose of increasing the reaction rate and reducing the curing temperature. In case of combined use of at least two compounds with a same number of functional radicals among the bi- to tetra-functional compounds, or in case of combined use of at least two compounds with different numbers of functional radicals, such compounds may be combined after respective hydrolysis, or may be combined at first and then hydrolyzed together. The hydrolysis liberates an alcohol $HOR^3$, and the compound of the general formula-(I) is converted into a corresponding silanol:

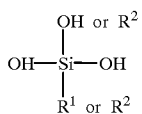

Silanol shows rapid dehydrating condensation, thus generating an oligomer. Consequently, the hydrolyzed product may be let to stand for 1 to 24 hours after hydrolysis, in order to encourage this reaction.

Explanation of the component (b)

This component is modified sol, which is a colloidal dispersion, in a dispersion medium, of "double-structured colloid particles consisting of nuclei of (1) colloid particles of tin oxide (sol), surrounded perfectly or imperfectly by (2) colloid particles of tin oxide-tungsten oxide complex (sol)". The tin oxide colloid particles (1) constituting nuclei generally have a particle size of 4 to 50 nm. The surrounding complex colloid particles (2) generally have a particle size of 2 to 7 nm. The tin oxide particles (1) constituting nuclei are positively charged. For this reason, they show coagulation (gelation) if they are mixed with the component (a), of which molecule has a negative charge because of $—SiO^-H^+$ structure. On the other hand, the complex particles (2) are negatively charged, and do not show such coagulation even if mixed with the component (a).

The tin oxide-tungsten oxide complex sol is generally produced by adding aqueous solution of sodium stannate, under strong agitation at room temperature, to aqueous solution of tungstic acid, obtained by ion exchange of aqueous solution of sodium tungstate. The weight ratio of $WO_3/SnO_2$ in the complex sol is generally from 0.5 to 100. A ratio below 0.5 or above 100 provides a coated film of reduced performance when the coating composition of the present invention is prepared and coated.

The modified sol can be prepared by adding, to aqueous sol of tin oxide (1) in an amount of 100 parts by weight of $SnO_2$, aqueous sol of the complex (2) in an amount of 2 to 100 parts by combined weight of $WO_3$ and $SnO_2$ under strong agitation at room temperature. Also in this case, an amount below 2 parts or above 100 parts provides a film of reduced performance when the coating composition of the present invention is prepared and coated. The double-structured colloid particles of the modified sol generally have a particle size of 4.5 to 60 nm. The mixing of the aqueous sol of tin oxide (1) and the aqueous sol of the complex (2) is estimated to cause chemical bonding of the two, and the obtained modified sol is estimated to exist stably for this reason. Such modified sol itself is already known as disclosed in the Japanese Patent Laid-open Application No. 3-217230.

In the present invention, there may be employed a curing catalyst (c), as will be explained below, for the purpose of accelerating the reaction and realizing the curing at a lower temperature.

Explanation of the component (c):

The curing catalyst (c) is employed when required in forming a coated film of a three-dimensional network structure by polymerization of the component (a) but it should not deteriorate the stability of the coating composition. Examples of said catalyst are listed as (1) to (8) in the following:

(1) Amines: such as monoethanolamine, diethanolamine, isopropanolamine, ethylenediamine, isopropylamine, diisopropylamine, morpholine, triethanolamine, diaminopropane, aminoethylethanolamine, dicyanamide, triethylenediamine or 2-ethyl-4-methylimidazole;

(2) Metal complexes: such as aluminum chelate represented by a general formula $AlX_nY_{a-n}$, wherein X stands for a radical OL in which L is a lower alkyl radical, Y is at least a ligand derived from a general formula $M^1COCH_2COM^2$ or $M^1COCH_2COOM^2$ in which $M^1$ and $M^2$ are lower alkyl radicals, and n is 0, 1 or 2.

Examples of particularly useful chelate in terms of solubility, stability and curing a catalyst include aluminum acetylacetonate, aluminum bisethylacetoacetate monoacetylacetonate, aluminum di-n-butoxide monoethylacetonate and aluminum di-isopropoxide monomethylacetoacetate.

Other examples of such metal complex include chromium acetylacetonate, titanium acetylacetonate, cobalt acetylacetonate, iron (III) acetylacetonate, manganese acetylacetonate, nickel acetylacetonate, EDTA, and complexes of Al, Fe, Zn, Zr and Ti;

(3) Metal alkoxides: such as aluminum triethoxide, aluminum tri-n-propoxide, aluminum tri-n-butoxide, tetraethoxytitanium, tetra-n-butoxy titanium or tetra-i-propoxy titanium;

(4) Organometallic salts: such as sodium acetate, zinc naphthenate, cobalt naphthenate, zinc octylate or tin octylate;

(5) Perchlorate salts: such as magnesium perchlorate or ammonium perchlorate;

(6) Organic acids and the anhydrides: such as malonic acid, succinic acid, tartaric acid, azipic acid, azelaic acid, maleic acid, o-phthalic acid, terephthalic acid, fumalic acid, itaconic acid, oxaloacetic acid, succinic anhydride, maleic anhydride, itaconic anhydride, 1,2-dimethylmaleic anhydride, phthalic anhydride, hexahydrophthalic anhydride or naphthalic anhydride;

(7) Lewis acids: such as ferric chloride or aluminum chloride; and (8) Metal halides: such as stannous chloride, stannic chloride, tin bromide, zinc chloride, zinc bromide, tetrachlorotitanium, titanium bromide, thalium bromide, germanium chloride, hafnium chloride, lead chloride or lead bromide.

The above-mentioned catalysts may be employed individually or as a mixture of two or more. Particularly in a case that the component (a) has an epoxy radical, there may be employed a catalyst which also serves as a catalyst for ring-cleaving polymerization of the epoxy radical.

Aluminum chelate is a particularly preferred catalyst.

Also according to the invention, there may be employed a solvent (d) as will be explained in the following, for the purpose of improving the flowability in the film coating and improving the smoothness of the cured film.

Explanation of the component (d)

The solvent (d) is employed when required, for maintaining the coating composition in liquid or reducing the viscosity thereof, and can for example be water, a lower alcohol, acetone, an ether, a ketone or an ester.

In the coating composition of the present invention, per 100 parts by weight (solid) of the component (a), there is employed the component (b) in an amount of 10 to 400 parts by weight, preferably 50 to 250 parts by weight, and, per 100 parts by weight of the components (a) and (b) in total, the component (c) is employed in an amount of 0.00001 to 20 parts by weight.

The component (d) is employed in a suitable amount, according to the viscosity of the composition.

In addition to the foregoing components (a) to (d), there may be employed, if required, various additive materials for the purpose for example of improving the adhesion to the substrate (molded article) or improving the weather resistance, or improving the stability of the coating composition.

Examples of such additive material include pH regulating material, viscosity regulating agent, levelling agent, matting agent, dye, pigment, stabilizer, ultraviolet absorbing agent and antioxidant agent.

Furthermore, there may be employed in combination epoxy resin or other organic polymers for the purpose of improving the dyeability of the coated film. Examples of such epoxy resin include polyolefinic epoxy utilized for paints and for molding, alycyclic epoxy resin such as cyclopentadieneoxide, cyclohexeneoxide or polyglycidyl ester, polyglycidylether, epoxylated vegetable oil, epoxynovolac composed of novolac phenolic resin and epichlorhydrine, and glycidyl methacrylate-methyl methacrylate copolymer.

Examples of the other organic polymers include polyol, cellulose resins, and melamine resin.

Furthermore, various surfactants may be employed in the coating composition, for the purpose of improving the flowability at coating and also improving the smoothness of the coated film thereby reducing the friction coefficient of the coated surface. For these purposes particularly effective is block or graft copolymer of dimethylsiloxane and alkyleneoxide, or a fluorinated surfactant.

Also in certain cases, there may be added inorganic filler such as silica sol, antimony oxide sol or fine diamond particles within an extent not contrary to the object of the present invention.

The composition of the present invention is coated particularly on a molded plastic article. In terms of the material constituting such molded article, the composition of the present invention may be coated, for example, on polymethyl methacrylate or a copolymer thereof, acrylonitrile-styrene copolymer, polycarbonate, cellulose acetate, polyvinyl chloride, polyethylene terephthalate, epoxy resin, unsaturated polyester resin, polyurethane resin or CR-39 polymer.

In terms of the form of the molded article, the composition of the present invention may be coated on an ingot, a wire or a film.

In terms of the function of the molded article, the composition of the present invention may be coated on optical products, particularly a lens for a camera, a spectacle lens, a mirror or a-prism.

The composition of the present invention is particularly useful as an antiscratch film for a spectacle lens molded with resin of a high refractive index at least equal to $n_d$=1.60.

In addition to the molded plastic articles, the composition of the present invention may be coated on inorganic glass, wood or metallic articles.

Coating may be achieved by ordinary coating means such as brush coating, dipping, roller coating, spin coating, spray coating or flow coating.

It is furthermore possible to coat the composition of the present invention on a mold and to pour and polymerize the material for the substrate thereby forming the molded plastic article, or to coat the composition of the present invention on a molded article, then to bring the surface of the uncured coated film in contact with a mold and to cure said coated film thereon.

The coating composition of the present invention is turned, after coating, into a hard coated film by a heating treatment in most cases. A heating temperature of ca. 50 to 200° C., preferably 80 to 140° C., is sufficient for this purpose.

The thickness of the coated film, after drying, is generally in a range of 0.3 to 30 μm, preferably 0.5 to 10 μm.

The coated film is transparent and is excellent in hardness, particularly in the scratch resistance. Thus it can prevent the deterioration of appearance and lens performance resulting from the scratches which have been a principal drawback of the molded plastic articles, and there can be obtained molded articles of extremely high quality.

In the following the present invention will be clarified in more details by embodiments thereof, but the present invention is by no means limited by such embodiments.

As explained in the foregoing, the present invention provides a coating composition which has following features:

(1) When a cured coated film is formed on a plastic spectacle lens of a medium to high refractive index and an antireflection film is formed thereon, the reflected color is free from unevenness;
(2) The coated film is excellent in scratch resistance, abrasion resistance, surface hardness, flexibility, transparency, heat resistance and moisture resistance;
(3) The coated film is flexible and shows little crack formation on the film surface even when the substrate is bent;
(4) The coated film shows little contraction at the curing, thus being capable of avoiding the curling trouble when coated on a thin film or the like;
(5) The coated film is excellent in antistatic ability, thus being relatively free from smearing;
(6) The coated film can be dyed with a dispersed dye;
(7) The coated film has a high surface reflectance;
(8) The coated film shows satisfactory adhesion to an antireflective film or an metallic vapor deposition film; and
(9) The coated film shows satisfactory sliding characteristic (low friction coefficient).

DETAILED DESCRIPTION OF THE PREFERRED EMBODIMENTS

EXAMPLE (1) Preparation of preliminary composition A 248 parts by weight of γ-glycidoxipropylmethyldiethoxysilane were charged in a reaction vessel provided with a rotor, and, under vigorous agitation with a magnetic stirrer, 36 parts by weight of 0.05N aqueous solution of hydrochloric acid were added at a time.

The reaction mixture was unhomogeneous immediately after the addition, but turned into homogeneous, colorless and transparent solution, with heat generation, with several minutes. The agitation was further continued for one hour to obtain a hydrolyzed product corresponding to the component (a).

The thus obtained hydrolyzed product was subjected to the addition of 56.6 parts by weight of ethanol and 53.4 parts by weight of ethylene glycol as the component (d), and then 4.7 parts by weight of aluminum acetylacetonate as the component (c), and a preliminary composition A was obtained by sufficient dissolving by mixing.

(2) Preparation of preliminary composition B 212.4 parts by weight of γ-glycidoxipropyltrimethoxysilane were charged in a reaction vessel provided with a rotor, and the temperature in the vessel was maintained at 10° C. Under vigorous agitation with a magnetic stirrer, 48.6 parts by weight of 0.01 N aqueous solution of hydrochloric acid were dropwise added. The cooling was terminated immediately after the end of dropwise addition, whereby obtained was a hydrolyzed product corresponding to the component (a), in homogeneous, colorless and transparent solution.

Thus obtained hydrolyzed product was subjected to the addition of 77.1 parts by weight of ethanol and 37.7 parts by weight of ethylene glycol as the component (d), and then 7.65 parts by weight of aluminum acetylacetonate as the component (c), and a preliminary composition B was obtained by sufficient dissolving by mixing.

(3) Preparation of coating compositions

Aqueous complex sol was prepared by adding aqueous solution of sodium stannate, under strong agitation at room temperature, -to aqueous solution of tungstic acid, prepared by ion exchange of aqueous solution of sodium tungstate. Said sol had a weight ratio $WO_3/SnO_2$ of about 1, and a particle size of about 4–5 nm.

Then commercially available aqueous tin oxide sol (particle size ca. 7–40 nm) was prepared in an amount of 100 parts by weight of $SnO_2$, and modified sol (s.g.=1.030) was prepared by adding thereto, under strong agitation at room temperature, the above-mentioned complex sol in an amount of 25–60 parts by combined weight of $WO_3$ and $SnO_2$. Thereafter a purifying process was conducted to obtain high concentration modified sol with s.g.=ca. 1.172. The colloid particles of said sol had a double structure in which nuclei of tin oxide particles of a particle size of ca. 7–40 nm are surrounded by complex particles of a particle size of ca. 4–5 nm.

The preliminary compositions A and B, prepared as explained in (1) and (2), were measured in glass containers, in different proportions as shown in Table 1, in a combined amount of 100 parts by weight (not solid content), and each was added with 50 parts by weight (net solid content) of the high concentration modified sol prepared as explained above and 0.4 parts by weight of a silicone surfactant, followed by sufficient agitation, to obtain a coating composition in homogeneous, colorless and transparent solution.

(4) Coating

Each of the coating compositions mentioned above was coated by dipping method (pull-up speed of 10 cm/min.) on a commercially available polyurethane spectacle lens with a refractive index of $n_d$=1.66, and was cured by heating for 2 hours at 100° C.

(5) Evaluation

The lenses with the cured coated films obtained in (4) were subjected to the following tests, for evaluating the performance of the coated film:

(i) Scratch resistance test

Scratch resistance was tested by rubbing the film surface with steel wool #0000, and was evaluated as follows:

| | |
|---|---|
| ++ | no scratch even with strong rubbing; |
| + | slight scratches by considerably strong rubbing; |
| – | scratched even with weak rubbing. |

The lens without the coated film was evaluated as (–)

(ii) Appearance

On the cured coated film obtained as explained in (4), an ordinary antireflection film was formed by vacuum vapor deposition method and evaluated as follows by visual observation of the reflected color:

| | |
|---|---|
| ++ | no unevenness in the reflected color; |
| + | some unevenness in the reflected color; |
| – | significant unevenness in the reflected color. |

(iii) Adhesion

The lens with cured coated film was immersed in hot water of 90° C. for 2 hours. Then the coated film was cut with a knife with a pitch of 1 mm in vertical and horizontal directions to form checkerboard squares. Then a cellophane adhesive tape "Cellotape (trade name)" supplied by Nichiban Co., Ltd. was applied firmly, and then was rapidly peeled off in a direction perpendicular to the coated film, and the number of the checkerboard squares in which the coated film was peeled off was counted. The number X of such peeled squares is represented as a ratio X/100. A smaller value of X indicates better adhesion.

(iv) Dyeability

The lens with cured coated film was immersed in a bath of dispersion dyes (mixture of red, yellow and blue) at 90° C., for 30 minutes, and the level of dyeing was evaluated by optical transmittance.

The results of these evaluations are shown in Table 1.

REFERENCE EXAMPLE 1

A coating composition was prepared and evaluated in the same manner as the foregoing example, except that the tin oxide-tungsten oxide complex colloid was replaced by commercially available silica sol (dispersed in methanol, average particle size 13±1 nm, solid content 20%).

REFERENCE EXAMPLE 2

A coating composition was prepared and evaluated in the same manner as the foregoing example, except that the tin oxide-tungsten oxide complex colloid was replaced by commercially available antimony pentoxide sol (average particle size 15 nm, solid content 20%).

The results of evaluations are also shown in Table 1.

TABLE 1

| Preliminary composition | | Scratch resist- | Appear- | Adhe- | Dyeabil- |
|---|---|---|---|---|---|
| A | B | ance | ance | sion | ity (%) |
| Example | | | | | |
| 1 | 0 | 100 | ++ | ++ | 0/100 | 72.4 |
| 2 | 20 | 90 | ++ | ++ | 0/100 | 66.3 |
| 3 | 20 | 80 | ++ | ++ | 0/100 | 61.9 |
| 4 | 30 | 70 | ++ | ++ | 0/100 | 56.8 |
| 5 | 40 | 60 | ++ | ++ | 0/100 | 49.8 |
| 6 | 50 | 50 | ++ | ++ | 0/100 | 40.5 |
| Reference Example | | | | | |
| 1 | 0 | 100 | ++ | – | 0/100 | 75.2 |
| 2 | 0 | 100 | + | + | 7/100 | 75.6 |

What is claimed is:

1. A lens comprising:

a plastic substrate obtained by polymerizing a monomer mixture containing at least a polyisocyanate and at least a polyol and/or at least a polythiol; and a cured film, of which thickness ranges from 0.3 μm to 30 μm, formed on said plastic substrate by coating and curing a coating composition containing (a) an organic silicon compound represented by a general formula:

$$R^1_a R^2_b Si(OR^3)_{4-(a+b)}$$

wherein:

$R^1$ stands for an epoxy functional organic radical;

$R^2$ stands for a hydrocarbon or halogenated hydrocarbon radical with 1 to 6 carbon atoms;

$R^3$ stands for an alkyl, alkoxyalkyl or acyl radical with 1 to 4 carbon atoms;

a=1, b=0 or 1, and a+b is 1 or 2; and (b) modified sol of a double structure in which nuclei composed of tin oxide colloid particles are surrounded by tin oxide-tungsten oxide complex colloid particles, wherein per 100 parts by weight (solid) of component (a), the amount of component (b) is 100 to 200 parts by weight.

2. A lens according to claim 1, further comprising a multi-layered antireflection film on said cured film.

3. A lens according to claim 1, wherein a mean particle size of said tin oxide colloid particles is from 4 to 50 nm.

4. A lens according to claim 1, wherein a mean particle size of said tin oxide-tungsten oxide complex colloid particles is from 2 to 7 nm.

5. A lens according to claim 1, wherein a mean particle size of said tin oxide colloid particles is from 4 to 50 nm and a mean particle size of said tin oxide-tungsten oxide complex colloid particles is from 2 to 7 nm.

6. A lens according to claim 1, wherein a weight ratio of tungsten oxide to tin oxide in each of said tin oxide-tungsten oxide complex colloid particles is from 0.5 to 100.

7. A lens according to claim 1, wherein a mean particle size of double-structured particles of the modified sol is from 4.5 to 60 nm.

8. A lens according to claim 1, wherein a curing catalyst selected from the group consisting of amines, metal complexes, metal alkoxides, organometallic salts, perchlorate salts, organic acids and anhydrides thereof, Lewis acids, and metal halides is added to at least one of the components (a) and (b).

9. A lens according to claim 1, wherein said plastic substrate has a refractive index (nd) of at least 1.60.

10. A lens comprising:
a plastic substrate obtained by polymerizing a monomer mixture containing at least a polyisocyanate and at least a polyol and/or at least a polythiol; and
a cured film, of which thickness ranges from 0.3 μm to 30 μm, formed on said plastic substrate by coating and curing a coating composition containing
(a) a hydrolyzed product of an organic silicon compound represented by a general formula:

$$R^1_a R^2_b Si(OR^3)_{4-(a+b)}$$

wherein:
$R^1$ stands for an epoxy functional organic radical;
$R^2$ stands for a hydrocarbon or halogenated hydrocarbon radical with 1 to 6 carbon atoms;
$R^3$ stands for an alkyl, alkoxyalkyl or acyl radical with 1 to 4 carbon atoms;
a=1, b=0 or 1, and a+b is 1 or 2; and
(b) modified sol of a double structure in which nuclei composed of tin oxide colloid particles are surrounded by tin oxide-tungsten oxide complex colloid particles, wherein per 100 parts by weight (solid) of component (a), the amount of component (b) is 100 to 200 parts by weight.

11. A lens according to claim 10, further comprising a multi-layered antireflection film on said cured film.

12. A lens according to claim 10, wherein a mean particle size of said tin oxide colloid particles is from 4 to 50 nm.

13. A lens according to claim 10, wherein a mean particle size of said tin oxide-tungsten oxide complex colloid particles is from 2 to 7 nm.

14. A lens according to claim 10, wherein a mean particle size of said tin oxide colloid particles is from 4 to 50 nm and a mean particle size of said tin oxide-tungsten oxide complex colloid particles is from 2 to 7 nm.

15. A lens according to claim 10, wherein a weight ratio of tungsten oxide to tin oxide in each of said tin oxide-tungsten oxide complex colloid particles is from 0.5 to 100.

16. A lens according to claim 10, wherein a mean particle size of double-structured particles of the modified sol is from 4.5 to 60 nm.

17. A lens according to claim 10, wherein a curing catalyst selected from the group consisting of amines, metal complexes, metal alkoxides, organometallic salts, perchlorate salts, organic acids and anhydrides thereof, Lewis acids, and metal halides is added to at least one of the components (a) and (b).

18. A lens according to claim 10, wherein said plastic substrate has a refractive index (nd) of at least 1.60.

19. A lens comprising:
a plastic substrate having a refractive index (nd) of 1.60 to 1.66 and comprising a polyurethane resin obtained by polymerizing a monomer mixture containing at least a polyisocyanate and at least a polyol and/or at least a polythiol; and
a cured film, of which thickness ranges from 0.3 Am to 30 μm, formed on said plastic substrate by coating and curing a coating composition containing
(a) an organic silicon compound represented by a general formula:

$$R^1_a R^2_b Si(OR^3)_{4-(a+b)}$$

wherein:
$R^1$ stands for an epoxy functional organic radical;
$R^2$ stands for a hydrocarbon or halogenated hydrocarbon radical with 1 to 6 carbon atoms;
$R^3$ stands for an alkyl, alkoxyalkyl or acyl radical with 1 to 4 carbon atoms;
a=1, b=0 or 1, and a+b is 1 or 2; and
(b) modified sol of a double structure in which nuclei composed of tin oxide colloid particles are surrounded by tin oxide-tungsten oxide complex colloid particles, wherein per 100 parts by weight (solid) of component (a), the amount of component (b) is 100 to 200 parts by weight.

20. A lens according to claim 19, further comprising a multi-layered antireflection film on said cured film.

21. A lens according to claim 19, wherein a mean particle size of said tin oxide colloid particles is from 4 to 50 nm.

22. A lens according to claim 19, wherein a mean particle size of said tin oxide-tungsten oxide complex colloid particles is from 2 to 7 nm.

23. A lens according to claim 19, wherein a mean particle size of said tin oxide colloid particles is from 4 to 50 nm and a mean particle size of said tin oxide-tungsten oxide complex colloid particles is from 2 to 7 nm.

24. A lens according to claim 19, wherein a weight ratio of tungsten oxide to tin oxide in each of said tin oxide-tungsten oxide complex colloid particles is from 0.5 to 100.

25. A lens according to claim 19, wherein a mean particle size of double-structured particles of the modified sol is from 4.5 to 60 nm.

26. A lens according to claim 19, wherein a curing catalyst selected from the group consisting of amines, metal complexes, metal alkoxides, organometallic salts, perchlorate salts, organic acids and anhydrides thereof, Lewis acids, and metal halides is added to at least one of the components (a) and (b).

27. A lens comprising:
a plastic substrate having a refractive index (nd) of 1.60 to 1.66 and comprising a polyurethane resin obtained by polymerizing a monomer mixture containing at least a polyisocyanate and at least a polyol and/or at least a polythiol; and
a cured film, of which thickness ranges from 0.3 Am to 30 μm, formed on said plastic substrate by coating and curing a coating composition containing
(a) a hydrolyzed product of an organic silicon compound represented by a general formula:

$$R^1_a R^2_b Si(OR^3)_{4-(a+b)}$$

wherein:
$R^1$ stands for an epoxy functional organic radical;
$R^2$ stands for a hydrocarbon or halogenated hydrocarbon radical with 1 to 6 carbon atoms;
$R^3$ stands for an alkyl, alkoxyalkyl or acyl radical with 1 to 4 carbon atoms;
a=1, b=0 or 1, and a+b is 1 or 2; and
(b) modified sol of a double structure in which nuclei composed of tin oxide colloid particles are surrounded by tin oxide-tungsten oxide complex colloid particles, wherein per 100 parts by weight (solid) of component (a), the amount of component (b) is 100 to 200 parts by weight.

28. A lens according to claim 27, further comprising a multi-layered antireflection film on said cured film.

29. A lens according to claim 27, wherein a mean particle size of said tin oxide colloid particles is from 4 to 50 nm.

30. A lens according to claim 27, wherein a mean particle size of said tin oxide-tungsten oxide complex colloid particles is from 2 to 7 nm.

31. A lens according to claim 27, wherein a mean particle size of said tin oxide colloid particles is from 4 to 50 nm and a mean particle size of said tin oxide-tungsten oxide complex colloid particles is from 2 to 7 nm.

32. A lens according to claim 27, wherein a weight ratio of tungsten oxide to tin oxide in each of said tin oxide-tungsten oxide complex colloid particles is from 0.5 to 100.

33. A lens according to claim 27, wherein a mean particle size of double-structured particles of the modified sol is from 4.5 to 60 nm.

34. A lens according to claim 27, wherein a curing catalyst selected from the group consisting of amines, metal complexes, metal alkoxides, organometallic salts, perchlorate salts, organic acids and anhydrides thereof, Lewis acids, and metal halides is added to at least one of the components (a) and (b).

* * * * *